United States Patent [19]

DeFoe

[11] Patent Number: 4,653,462
[45] Date of Patent: Mar. 31, 1987

[54] SUPPORT AND POSITIONING OF COOKING UTENSILS

[76] Inventor: Peter S. DeFoe, 61 Main St., Claremont, N.H. 03743

[21] Appl. No.: 750,852

[22] Filed: Jul. 1, 1985

[51] Int. Cl.⁴ ............................................. F24C 15/30
[52] U.S. Cl. ..................................... 126/24; 248/172; 211/80; 211/175
[58] Field of Search ................. 126/24, 246, 261, 268, 126/265, 266, 267, 262; 211/4, 74, 80, 175; 248/153, 670, 175, 172

[56] References Cited

U.S. PATENT DOCUMENTS 1,319,322  10/1919  Berglann .............................. 126/24
1,343,341   6/1920  Berglann .............................. 126/24
1,371,407   3/1921  Berglann .............................. 126/24
1,443,883   1/1923  Ménard ............................ 126/214 C
2,520,412   8/1950  Jensen .................................. 126/24
2,853,126   9/1958  Corlet .............................. 126/38 X
2,928,386   3/1960  Keyt et al. ..................... 126/214 C
4,445,495   5/1984  Frost .................................. 126/24

Primary Examiner—Larry Jones
Attorney, Agent, or Firm—George E. Kersey

[57] ABSTRACT

An apparatus for supporting and positioning a cooking utensil with respect to a burner is disclosed. The apparatus includes a movable support which when rotated moves a positioning member into engagement with the utensil. The apparatus forms a pivoted galley stove.

12 Claims, 6 Drawing Figures

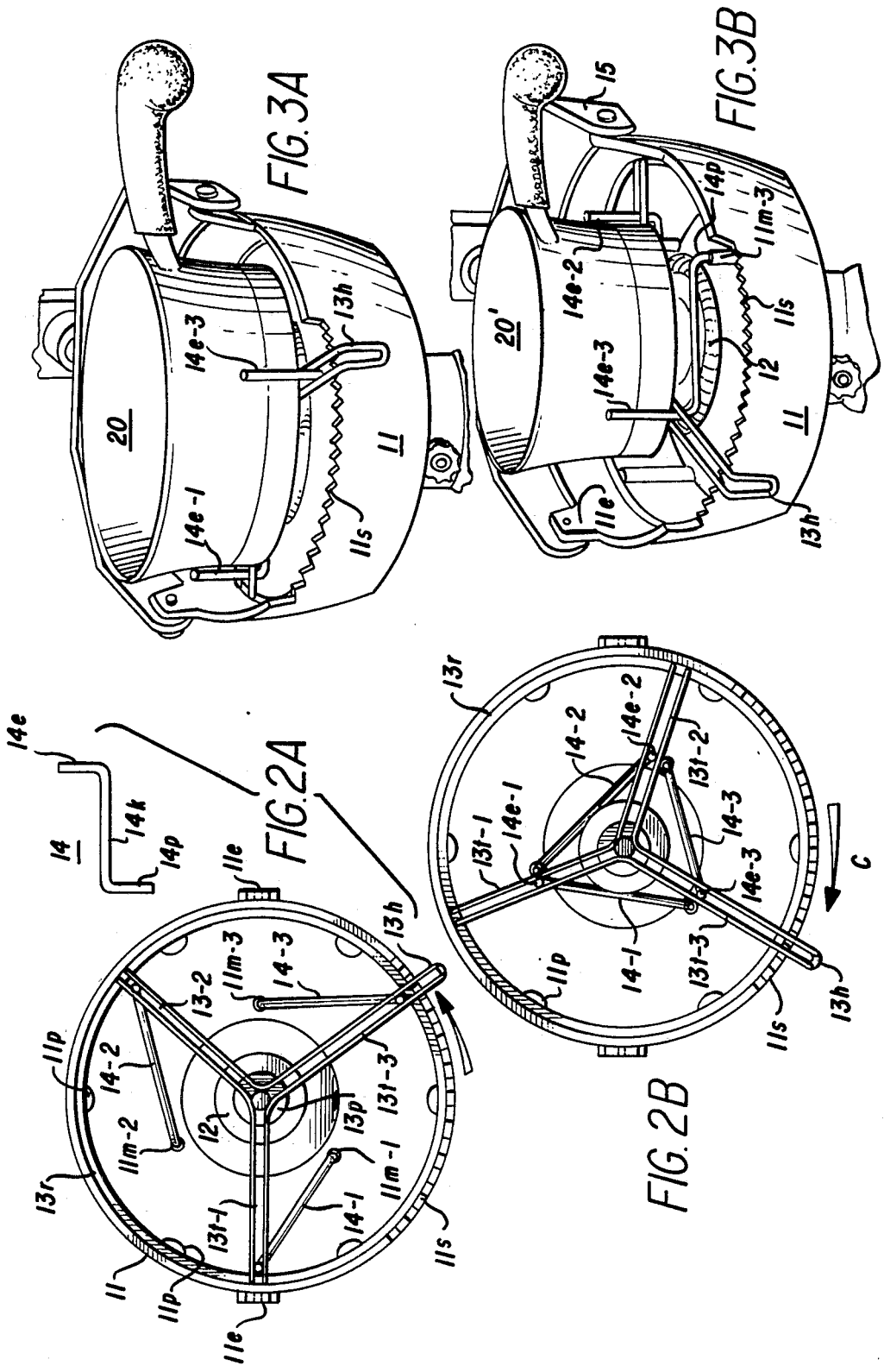

SUPPORT AND POSITIONING OF COOKING UTENSILS

BACKGROUND OF THE INVENTION

This invention relates to the support and positioning of cooking utensils, particularly by a galley stove.

A galley stove is one that is intended for marine operation. Such a stove requires a gimbal mounting in order to accommodate the roll and the pitch of the vessel on which it is used. In addition it is important to stabilize the cooking utensil placed on such a stove and properly position the cooking utensil with respect to the burner flame. In the usual case, relative stability is provided by the gimbal mounting, but this does not completely compensate for roll and pitch of the vessel. There are inevitable transient disturbances which often disturb the cooking utensil that is placed on the stove. In addition, in order to make the most efficient use of heating, it is important that the cooking utensil be properly located with respect to the flame.

In the ordinary arrangement, there is no provision to assure proper support and positioning of the cooking utensil. The result is that a transient disturbance in the vessel will often cause the cooking utensil to change its position on the galley stove. Even under calm conditions the cooking utensil is not usually placed in the best position for making the most effective heat transfer.

Accordingly it is an object of the invention to facilitate the support and positioning of cooking utensils. A related object is to facilitate the support and positioning of cooking utensils on galley stoves. A related object is to facilitate support and positioning despite pitch and roll motions that accompany the movement of the vehicle in which the stove is mounted.

Another object of the invention is to achieve proper support and positioning of cooking utensils, particularly for galley stoves.

Still another object of the invention is to provide a mechanically simple and inexpensive mechanism for the positioning and support of cooking utensils on stoves, particularly stoves that are intended for shipboard use.

A further object of the invention is to achieve proper positioning and support by a mechanism which can be controlled from the front of the stove, away from the burner flame, in order to avoid the possibility of injury or burn to the user.

SUMMARY OF THE INVENTION

In accomplishing the foregoing and related objects the invention provides a support, for a cooking utensil, in which the center of the support is positionable over a burner and at least one track extends radially outward from the center. A positioning member having a movable end that extends upwardly in the track is linked to an opposite end, pivotably mounted and below the support. Rotation of the support causes the upwardly extending end of the positioning member to move along the track and be engageable with any utensil that is placed on the support.

In accordance with one aspect of the invention the support includes a plurality of open tracks and a separate, pivotably mounted positioning member for each track. In particular the support can have three open tracks which extend radially outward from the center and each track can include an upwardly extending end of a pivotably mounted positioning member. Each upward end moves along its track when the support is rotated.

In accordance with a further aspect of the invention the support is positioned within a housing such as an open pan and is held by a plurality of projections extending along an interior wall from the base of the housing. Each positioning member has its pivotable end mounted in a cylindrical housing which extends upwardly from the base and is displaced from the inner surface that contains the projections for the support.

In particular the cylindrical housing has a burner positioned at the center of the base. A circular aperture in the base surrounds a valve with one end connectable to a burner and the other end connectable to a fuel source. The latter can be a pressurized cylinder which is threadable upon the receiving end of the valve. In addition the burner is threadable on the opposite end of the valve. As a result the fuel source is removable and replaceable. In addition the threadable mounting of the burner makes it adjustable.

In accordance with yet another aspect of the invention the housing can be in the form of a partial shell with upstanding ears that are secured to a yoke of a gimbal. The yoke is in turn pivotably and perpendicularly connected to a mount. The support can include a circular ring that is held by the projection of the housing. Each track can be formed by a pair of rods which are spaced apart by at least the maximum width of the upwardly extending end of each positioning member. One particular support includes a circular ring that mounts three angled rods that are uniformly distributed on the ring and spaced from one another to form open tracks for the upstanding arms that are used in the positioning of each cooking utensil that is placed upon the support.

In accordance with still another aspect of the invention the support is positioned within a cylindrical pan that has a rim with a depressed portion extending over an arc length. Two of the rods that form the support extend outwardly from the center of the support beyond the edge of the arc. They are cylindrical and provide a handle for rotation of the support. These rods can be joined together at the handle and commence at one position of the ring, extend to the center, then inwardly across the ring to the center of the support and again outwardly to another position of the ring.

In accordance with a positioning method for cooking utensils with respect to a burner, a utensil is placed on a support having a center positionable over the burner and including at least one open track that extends radially outward from the center. The track contains an upwardly extending end of a member that is pivotably mounted below the support. When the support is rotated it causes the upwardly extending end to move along the track and be engagable with the utensil. When there are three tracks which extend radially outward from the center of the support, each track includes a pivotably mounted positioning member with an upwardly extending end that moves in an associated track. Rotation of the support causes the positioning members to move inwardly and outwardly in their associated tracks, depending upon the direction of rotation of the support. The support is desirably mounted on a gimballed pan by a rotationally mounted housing. This permits the positioning of the utensil on the support while the pan undergoes rotations with two degrees of freedom.

In a method of manufacturing apparatus for the position of cooking utensils with respect to a burner, a pan is provided with an interior cylindrical surface having projections for holding a grate. A separate grate for the pan is provided with a plurality of open tracks extending radially outward from the center position. Positioning members, one for each track of the grate, are pivotably disposed in the base of the pan. A valve is provided at a central aperture at the base of the pan and provision is made for a removable burner at one end of the valve and a removable fuel source at the other end of the valve. A gimbal yolk is provided for the pan and a ball bearing main gimbal is provided for the yolk. The pan desirably has a cylindrical surface with a stepped set of openings, one for a control handle of the grate and a further opening before the position of the mounting of the yolk on the pan. The depressed portion of the rim desirably includes a saw-tooth edge which is used to establish, with respect to the tracks, the location of the upwardly extending ends of the positioning members. These ends provide the desired positioning of the utensil by rotation of the support.

DESCRIPTION OF THE DRAWINGS

Other aspects of the invention will become apparent after considering several illustrative embodiments, taken in conjunction with the drawings in which:

FIGS. 2a and 2b are top views of the stove of FIG. 1 showing the support and positioning structure in accordance with the invention in open and closed positions;

FIG. 3a is a partial perspective view showing the support and positioning mechanism of the invention in relation to a relatively large utensil;

FIG. 3b is a partial perspective view showing the support and positioning mechanism of the invention used in connection with a smaller utensil.

DETAILED DESCRIPTION

Figure 1:
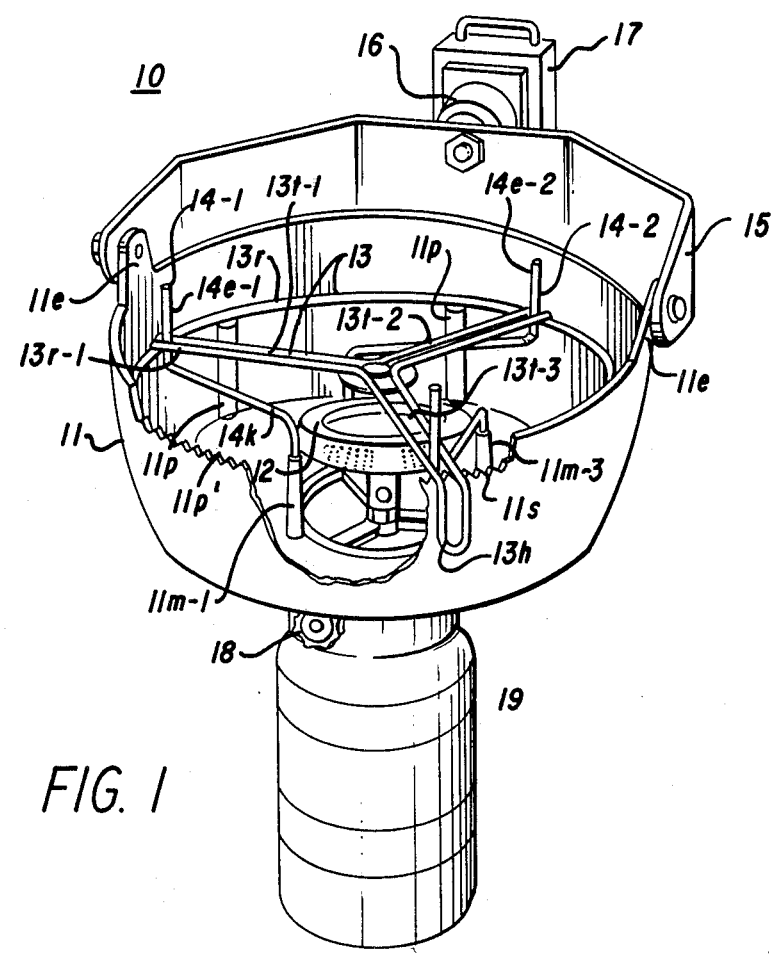
FIG. 1 is a perspective view of a galley stove in accordance with the invention.

With reference to the drawings, FIG. 1 shows a perspective view of a galley stove 10 in accordance with the invention. The stove 10 includes a pan 11 with a central opening for a burner element 12. The pan 11 is used to hold a support structure or grate 13 above the burner 12. As seen in FIG. 1 the grate 13 is formed by a ring 13r that is positioned on projections 11p of the pan 11. In addition to the ring 13r the grate includes tracks 13t-1 through 13t-3. The tracks are formed between rods 13r-1 through 13r-3. The rod 13r-1 extends from one position on the ring 13r to a center 13c and then to another position of the ring 13r. The rod 13r-1 continues to the center 13c and then outwardly beyond a lip 11p' over a serrated edge 11s to form a handle 13h.

Three positioning members 14-1, 14-2 and 14-3 extend from respective mounts 11m-1, 11m-2 and 11m-3 with upstanding ends 14e in respective tracks 13t-1, 13t-2 and 13t-3. Each of the positioning members 14 includes, in addition to an upstanding end 14a, a link 14k and a pivot end 14p.

The pan 11 has upstanding ears 11e which are used for the pivotable mounting of a yolk 15. The yolk 15 is in turn pivotably mounted to a main bearing 16. The main bearing 16 is in turn positioned on a quick disconnect mount 17. A valve 18 interconnects the burner 12 with a source of fuel 19.

In FIG. 1 the fontal portion of the pan 11 below the lip 13p is shown in fanthom to reveal details of the mounts for the positioning elements 14 and to show the relationship of those mounts to the burner element 12.

As indicated in FIG. 2a which shows the top view of the stove 10, the grate 13 has a ring 13r supported by projections 11p of the pan 11. The grate also includes individual tracks 13t-1, 13t-2 and 13t-3 secured by a central member 13p taking the form of a washer. As also indicated in FIG. 2 the positioning members 14-1 through 14-3 extend from cylindrical mounts 11m-1 through 11m-3 by central upstanding end tracks 14e-1 through 14e-3 in respective links 14k-1 through 14k-3. Shown in fanthom in FIG. 2 is the displacement of the upstanding or positioning ends of the members 14-1 through 14-3 when the handle 13h is rotated in a counterclockwise direction C as indicated by the arrow.

The effect of the counterclockwise rotation of the handle 13h in FIG. 2a from a fully open position in solid line form to a fully closed position in fanthom is illustrated in FIGS. 3a and 3b. In the fully open position the grate will accommodate a relatively large utensil 20. In the relatively closed position the grate will accommodate a relatively smaller utensil 20'.

Figure 4:
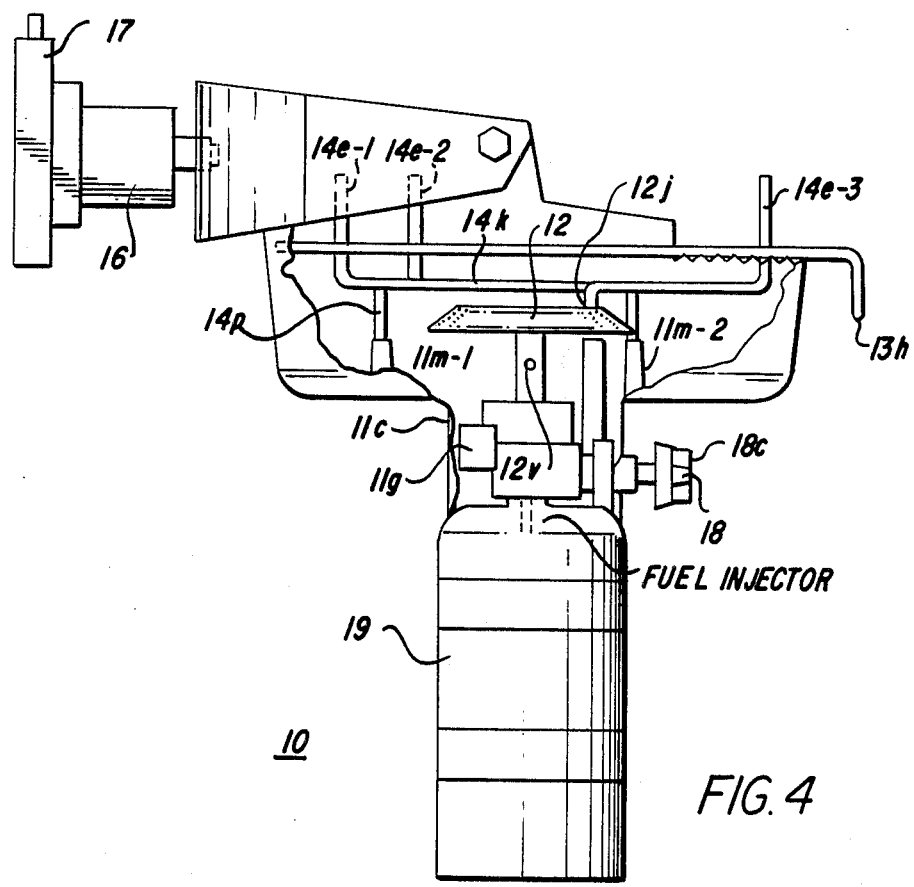
FIG. 4 is a partial sectional view of the stove of FIG. 1 illustrating the fuel source, control valve and burner in relation to the support and positioning structure that is used for the accurate placement of cooking utensils with respect to the burner.

Turning to FIG. 4, details of the relationship between the burner 12, the fuel source 19 and the valve 18 are indicated. The burner 12 is threadably positioned on the valve 18. The burner 12 includes an upper portion 12u with a series of apertures for circular distribution of the flame. The draft or air flow into the burner 12 is controlled by ventilator apertures 12v. The opening of the ventilator apertures 12v is determined by the extent to which the burner 12 is threaded on the valve 18.

The valve structure 18 is of the standard type for the accommodation of pressurized fuel bottles, for example the propane bottle 19. Accordingly the lower end of the valve 18b has a threaded collar that receives the threaded end (not shown) of the fuel bottle. As is well known, when the bottle is threaded onto the lower end, a projection (not shown) depresses an inner valve of the bottle 19 and allows the compressed fuel in the bottle 19 to enter the valve. When the control knob 19c is fully closed, fuel is held in check. When the control knob is opened, for example by being rotated in a counterclockwise direction, fuel can escape through the outlet 18a into the burner 12.

Also indicated in FIG. 4 is the presence of a central cup 11c which serves as a ring below the burner 12. In addition the pan 11 includes a lower cylinder 11c which acts the housing for the regulator 18. The length of the lower cylinder is proportioned to provide proper draft for the burner 12. A set of gussets 11g support the regulator within the cup opening.

In an illustrative embodiment of the invention the pan 11 is a solid alluminum casting with a built in drip pan. The regulator 18 has a positive off and on position and provides for precise flame adjustment. In addition the stove 10 uses standard propane bottles which are readily inavailable. These may be disconnected when partially used.

Other aspects of the invention will be apparent to those of ordinary skill in the art.

I claim:

1. Apparatus for positioning cooking utensils with respect to a burner, which comprises:

a support, for at least one utensil, positioned within said pan having a base and a side wall and held by a plurality of projections extending from said base along an interior portion of said side wall;

said support having a center positionable over the burner and including at least one open track extending radially outward from said center;

a positioning member having one end extending upwardly in said track and being linked to an opposite end pivotally mounted below said support;

said support including a circular ring held by said projections and said track is formed by a pair of rods that extend from said ring to said center and are spaced apart by at least the maximum width of the upwardly extending end; and said positioning member having its pivotal end mounted in a housing on said base and displaced from said side wall;

whereby the rotation of said support causes the upwardly extending end of said positioning member to move along said track and be engageable with said utensil.

2. Apparatus as defined in claim 1 wherein said pan includes a partial shell with upstanding ears that are pivotably secured to a gimbal yoke which is in turn pivotably connected to a mount with its axis of rotation perpendicular to said yoke at the position of connection to said mount.

3. Apparatus as defined in claim 1 wherein said support includes a circular ring mounting three angled rods which are uniformly distributed with respect to said ring and are spaced from one another to form said open tracks.

4. Apparatus for positioning cooking utensils with respect to a burner, which comprises:
   a support held by said pan, for at least one utensil, having a center positionable over the burner and including three open tracks extending radially outward from said center, and a separate, pivotally mounted positioning member for each track with an upwardly extending end that moves along said track when said support is rotated;
   said support including a circular ring mounting three angled rods which are uniformly distributed with respect to said ring and are spaced from one another to form said open tracks;
   said support being positioned within a pan which has a depressed rim extending over an arc length and two of said rods extend outwardly from said center beyond the edge of said arc thereby to provide a handle for the rotation of said support; and
   a positioning member having one end extending upwardly in said track and being linked to an opposite end pivotally mounted below said support;
   whereby the rotation of said support causes the upwardly extending end of said positioning member to move along said track and be engageable with said utensil.

5. Apparatus as defined in claim 4 wherein two of said rods are joined together at said handle and commence at one position of said ring, extend to said center and then outwardly to and beyond said arc, then downwardly at a displacement from said pan, then upwardly to the level of said ring, then inwardly to said center and outwardly to another position of said ring.

6. Apparatus as defined in claim 4 wherein said depressed rim includes a saw-toothed edge that is used to establish temporary stop positions for the rotation of said support.

7. Apparatus for positioning cooking utensils with respect to a burner, which comprises:
   a pan;
   a moveable support positioned within said pan, for at least one utensil, having a center positionable over the burner and including at least one open track extending radially outward from said center; and
   a positioning member having one end extending upwardly in said track and being linked to an opposite end pivotally mounted below said support;
   whereby the rotation of said support causes the upwardly extending end of said positioning member to move along said track and be engageable with said utensil;
   said pan having a base and a side wall and said support being held by projections extending from said base along an interior portion of said side wall; and
   said positioning member having its pivotal end mounted in a housing on said base and displaced from said side wall.

8. Apparatus as defined in claim 7 wherein said support includes a plurality of open tracks and a separate, pivoted positioning member for each track with an upwardly extending end in each track.

9. Apparatus as defined in claim 8 wherein said support has three open tracks which extend radially outward from said center, with each track including a pivotally mounted positioning member with an upwardly extending end that moves along said track when said support is rotated thereby to provide for positioning of a cooking utensil on said support.

10. Apparatus as defined in claim 7 wherein said pan has a burner positioned at the center of said base.

11. Apparatus a defined in claim 10 including a circular aperture in said base surrounding a valve with one end connectable to said burner and the other end connectable to a fuel source.

12. Apparatus as defined in claim 11 wherein said fuel source is a pressurized cylinder which is threadable upon one end of said valve and said burner is threadable on an opposite end of said valve;
   whereby said fuel source is replaceable and said burner is adjustable.

* * * * *